(12) United States Patent  
Shin et al.

(10) Patent No.: US 12,451,502 B2  
(45) Date of Patent: Oct. 21, 2025

(54) APPARATUS AND METHOD FOR CONTROLLING FUEL CELL

(71) Applicants: HYUNDAI MOTOR COMPANY, Seoul (KR); KIA CORPORATION, Seoul (KR)

(72) Inventors: Hyun Wook Shin, Anyang-si (KR); Hyo Jin Park, Hwaseong-si (KR); Jae Young Shim, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 1047 days.

(21) Appl. No.: 17/409,042

(22) Filed: Aug. 23, 2021

(65) Prior Publication Data

US 2022/0209263 A1 Jun. 30, 2022

(30) Foreign Application Priority Data

Dec. 29, 2020 (KR) .................. 10-2020-0186221

(51) Int. Cl.
*H01M 8/04664* (2016.01)
*B60H 1/00* (2006.01)
(Continued)

(52) U.S. Cl.
CPC .... *H01M 8/04664* (2013.01); *B60H 1/00385* (2013.01); *B60H 1/00807* (2013.01); *B60H 3/0092* (2013.01); *B60L 58/12* (2019.02); *B60L 58/30* (2019.02); *B60L 58/33* (2019.02); *B60W 10/28* (2013.01); *B60W 50/02* (2013.01); *F01P 3/18* (2013.01); *F01P 5/02* (2013.01); *H01M 8/04014* (2013.01); *H01M 8/04029* (2013.01); *H01M 8/04059* (2013.01); *H01M 8/04358* (2013.01); *H01M 8/04619* (2013.01);

(Continued)

(58) Field of Classification Search
None
See application file for complete search history.

(56) References Cited

U.S. PATENT DOCUMENTS

| | | | | |
|---|---|---|---|---|
| 2013/0323539 A1* | 12/2013 | Furusawa | ......... | H01M 8/04228 429/429 |
| 2017/0125861 A1* | 5/2017 | Machida | ............ | H01M 10/613 |
| 2019/0181476 A1* | 6/2019 | Jeong | ................ | H01M 8/04358 |

FOREIGN PATENT DOCUMENTS

DE 102018112480 A1 * 1/2019 .............. B60L 53/11

OTHER PUBLICATIONS

DE102018112480B4 English translation (Year: 2018).*

* cited by examiner

*Primary Examiner* — Ula C Ruddock
*Assistant Examiner* — Mary Grace Byram
(74) *Attorney, Agent, or Firm* — MCDONNELL BOEHNEN HULBERT & BERGHOFF LLP

(57) ABSTRACT

An apparatus for controlling a fuel cell includes a cooling module that cools a fuel cell stack, a first temperature sensor that measures ambient air temperature of a vehicle, and a processor that, when a cooling fan of the cooling module is detected to be defective, determines a fail-safe control method depending on a defect situation of the cooling fan, sets a first limit level depending on the ambient air temperature, sets a second limit level depending on a state of charge (SOC) of a battery and an output requirement, and controls limitation of output of the fuel cell stack, based on at least one of the fail-safe control method, the first limit level, or the second limit level.

9 Claims, 6 Drawing Sheets

(51) Int. Cl.
    *B60H 3/00*           (2006.01)
    *B60L 58/12*          (2019.01)
    *B60L 58/30*          (2019.01)
    *B60L 58/33*          (2019.01)
    *B60W 10/28*         (2006.01)
    *B60W 50/02*         (2012.01)
    *F01P 3/18*            (2006.01)
    *F01P 5/02*            (2006.01)
    *H01M 8/04007*       (2016.01)
    *H01M 8/04014*       (2016.01)
    *H01M 8/04029*       (2016.01)
    *H01M 8/0432*         (2016.01)
    *H01M 8/04537*       (2016.01)
    *H01M 8/04746*       (2016.01)
    *H01M 8/04858*       (2016.01)
    *H05K 7/20*           (2006.01)
    *B60H 1/32*           (2006.01)

(52) U.S. Cl.
    CPC ... *H01M 8/04686* (2013.01); *H01M 8/04768* (2013.01); *H01M 8/0488* (2013.01); *H01M 8/0491* (2013.01); *H01M 8/0494* (2013.01); *H05K 7/20172* (2013.01); *H05K 7/20309* (2013.01); *B60H 2001/3267* (2013.01); *B60H 2001/3282* (2013.01); *B60W 2050/021* (2013.01); *B60Y 2400/302* (2013.01); *H01M 2220/20* (2013.01); *H01M 2250/20* (2013.01)

APPARATUS AND METHOD FOR CONTROLLING FUEL CELL

CROSS REFERENCE TO RELATED APPLICATIONS

This application claims the benefit of priority to Korean Patent Application No. 10-2020-0186221, filed in the Korean Intellectual Property Office on Dec. 29, 2020, the entire contents of which are incorporated herein by reference.

TECHNICAL FIELD

The present disclosure relates to an apparatus and method for controlling a fuel cell.

BACKGROUND

With the increase in interest in environmental pollution, studies on environmentally-friendly energy sources have been increasingly conducted. Among them, a fuel cell system using a fuel cell, which produces electricity by an electrochemical reaction of hydrogen and oxygen, as an energy source has attracted attention. The fuel cell system generates heat as a reaction by-product. Accordingly, a cooling system for cooling a fuel cell stack so as to prevent a rise in the temperature of the fuel cell stack is essential for the fuel cell system.

The cooling system has a structure in which a cooling fan, a stack radiator, an electric radiator, and a condenser overlap one another. When a vehicle travels in harsh environments in a situation in which the cooling fan of the cooling system is defective, performance and durability of the fuel cell stack may be degraded due to a rise in the temperature of the fuel cell stack.

SUMMARY

The present disclosure has been made to solve the above-mentioned problems occurring in the prior art while advantages achieved by the prior art are maintained intact.

An aspect of the present disclosure provides a fuel cell control apparatus and method for optimally controlling output of a fuel cell stack in terms of performance and durability of the fuel cell stack in consideration of an environmental condition and a vehicle state in a situation in which a cooling fan is defective.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a fuel cell includes a cooling module that cools a fuel cell stack, a first temperature sensor that measures ambient air temperature of a vehicle, and a processor that, when a cooling fan of the cooling module is detected to be defective, determines a fail-safe control method depending on a defect situation of the cooling fan, sets a first limit level depending on the ambient air temperature, sets a second limit level depending on a state of charge (SOC) of a battery and an output requirement, and controls limitation of output of the fuel cell stack, based on at least one of the fail-safe control method, the first limit level, or the second limit level.

The cooling module may include the cooling fan that is disposed in front of the fuel cell stack and that introduces ambient air into the fuel cell stack, a stack radiator that is disposed in front of the cooling fan and that cools coolant circulating through the fuel cell stack, an electric radiator that is disposed in front of the stack radiator and that cools a power electronic part of the vehicle, and a condenser disposed in front of the stack radiator side by side with the electric radiator.

In the determination of the fail-safe control method, the processor may determine a first control method when either of fans in the cooling fan is defective and may determine a second control method when both the fans in the cooling fan are defective.

When the first control method is determined, the processor may limit the output of the fuel cell stack depending on coolant exit temperature of the fuel cell stack, based on a maximum output limit value depending on the coolant exit temperature and may increase revolutions per minute (RPM) of a normally-operating fan.

When the second control method is determined, the processor may decrease the output of the fuel cell stack in consideration of coolant exit temperature of the fuel cell stack, based on a maximum output limit value depending on the coolant exit temperature, may limit maximum torque of a drive motor, and may stop operation of an indoor air-conditioner.

The first limit level may be divided into three sections depending on ambient air temperature. The higher the ambient air temperature, the higher the level.

The second limit level may be divided into six sections depending on an available stack output level based on the SOC and the output requirement, and the higher the available stack output level, the higher the level.

The processor may correct a maximum output limit value of the fuel cell stack by applying at least one of a limiting factor matching the first limit level or a limiting factor matching the second limit level.

The processor may determine whether the defect in the cooling fan is recovered, while limiting the output of the fuel cell stack, and may control the output of the fuel cell stack by a normal control method when the defect in the cooling fan is recovered.

According to another aspect of the present disclosure, a method for controlling a fuel cell includes detecting a defect in a cooling fan that cools a fuel cell stack in a vehicle, determining a fail-safe control method depending on a defect situation of the cooling fan, setting a first limit level depending on ambient air temperature of the vehicle, setting a second limit level depending on a state of charge (SOC) of a battery and an output requirement, and limiting output of the fuel cell stack, based on at least one of the fail-safe control method, the first limit level, or the second limit level.

The determining of the fail-safe control method may include determining a first control method when either of fans in the cooling fan is defective and determining a second control method when both the fans in the cooling fan are defective.

The limiting of the output of the fuel cell stack may include limiting the output of the fuel cell stack depending on coolant exit temperature of the fuel cell stack, based on a maximum output limit value depending on the coolant exit temperature, when the first control method is determined and increasing revolutions per minute (RPM) of a normally-operating fan.

The limiting of the output of the fuel cell stack may include decreasing the output of the fuel cell stack in consideration of coolant exit temperature of the fuel cell stack, based on a maximum output limit value depending on the coolant exit temperature, when the second control method is determined and limiting maximum torque of a drive motor and stopping operation of an indoor air-conditioner.

The first limit level may be divided into three sections depending on ambient air temperature. The higher the ambient air temperature, the higher the level.

The second limit level may be divided into six sections depending on an available stack output level based on the SOC and the output requirement, and the higher the available stack output level, the higher the level.

The limiting of the output of the fuel cell stack may include correcting a maximum output limit value of the fuel cell stack by applying at least one of a limiting factor matching the first limit level or a limiting factor matching the second limit level.

The method may further include determining whether the defect in the cooling fan is recovered, while limiting the output of the fuel cell stack and controlling the output of the fuel cell stack by a normal control method, when the defect in the cooling fan is recovered.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
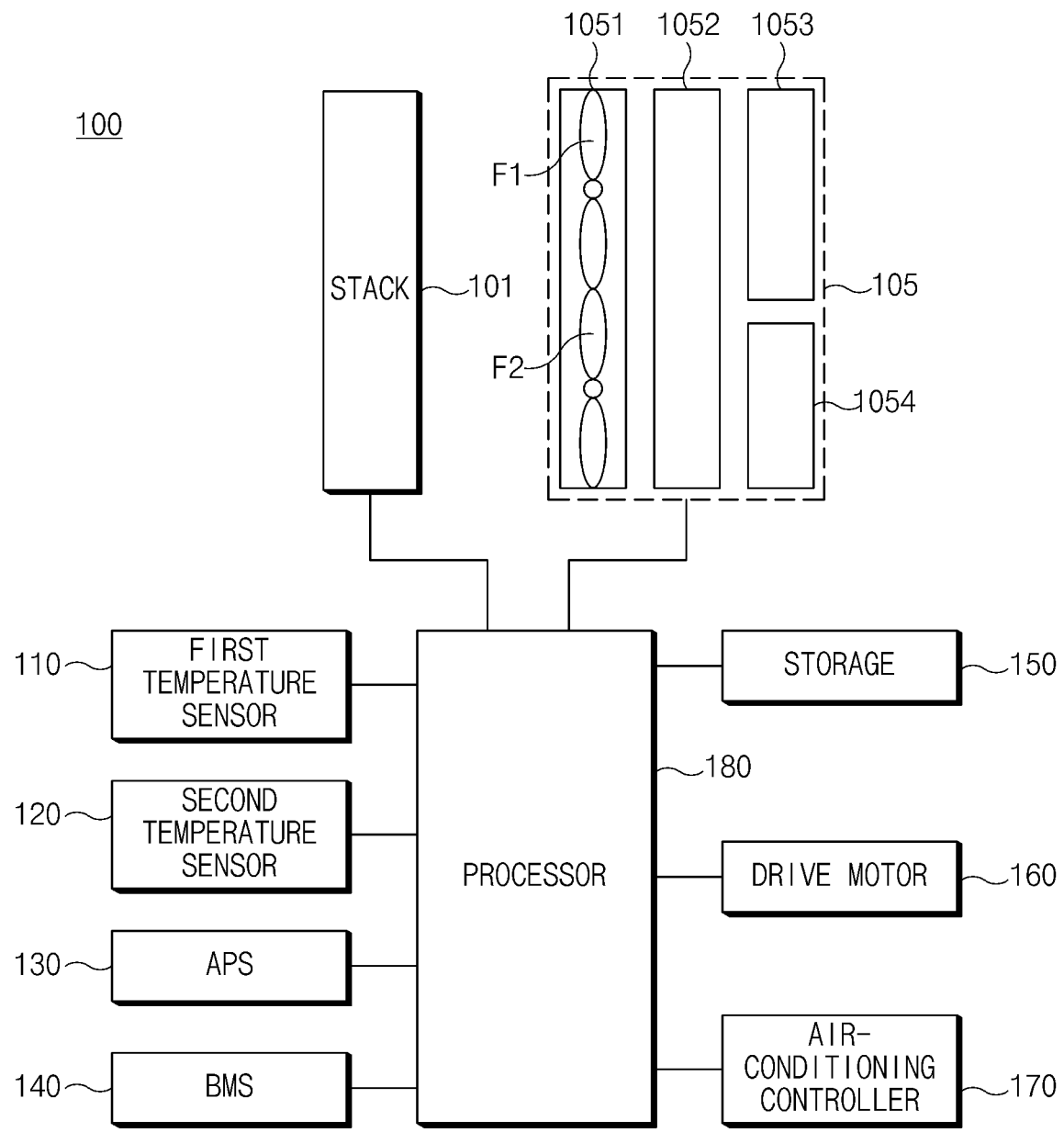
FIG. 1 is a block diagram illustrating a fuel cell control apparatus according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a fuel cell control apparatus according to embodiments of the present disclosure.

Referring to FIG. 1, the fuel cell control apparatus 100 may include a fuel cell stack (hereinafter, referred to as the stack) 101, a cooling module 105, a first temperature sensor 110, a second temperature sensor 120, an accelerator pedal sensor (APS) 130, a battery management system (BMS) 140, storage 150, a drive motor 160, an air-conditioning controller 170, and a processor 180 that are connected through a vehicle network. Here, the vehicle network may be implemented with a controller area network (CAN), a media oriented systems transport (MOST) network, a local interconnect network (LIN), Ethernet, and/or an x-by-wire (Flexray).

The stack 101 may produce electrical energy by an electrochemical reaction of hydrogen and oxygen. The electrical energy generated by the stack 101 may be supplied to the drive motor 160. Coolant may be introduced into the stack 101 to prevent a rise in the temperature of the stack due to heat generated during the electrochemical reaction. Output of the stack 101 may be adjusted under the control of the processor 180.

The cooling module 105 may be a device that cools the stack 101 and/or power electronic parts and supports cooling of the indoor space of a vehicle. The cooling module 105 may be disposed in front of the stack 101. The cooling module 105 may include a cooling fan 1051, a stack radiator 1052, an electric radiator 1053, and a condenser 1054.

The cooling fan 1051 may be disposed in front of the stack 101 and may cool the stack 101 by supplying, to the stack 101, ambient air passing through the stack radiator 1052 and the electric radiator 1053 or the condenser 1054. The cooling fan 1051 may include motors (not illustrated) that operate two fans F1 and F2. The amount of ambient air introduced into the stack 101 may be adjusted by the RPMs of the fans F1 and F2.

The stack radiator 1052 may be disposed in front of the cooling fan 1051 and may cool the coolant, the temperature of which is raised by thermal energy generated from the stack 101. The stack radiator 1052 may lower the temperature of the coolant through heat exchange between the coolant circulating through the stack 101 and the ambient air.

The electric radiator 1053 may be disposed in front of the stack radiator 1052 and may cool the coolant, the temperature of which is raised by thermal energy generated from the power electronic parts of the vehicle. The ambient air may be directly introduced into the electric radiator 1053, and therefore the electric radiator 1053 may be cooled by the ambient air.

The condenser 1054 may be disposed in front of the stack radiator 1052 side by side with the electric radiator 1053. The condenser 1054 may serve as a radiator of a cooling system (an air-conditioning apparatus). The condenser 1054 may liquefy a refrigerant by the ambient air directly introduced into the condenser 1054.

The first temperature sensor 110 may measure ambient air temperature of the vehicle. The first temperature sensor 110 may transmit the measured ambient air temperature to the processor 180.

The second temperature sensor 120 may be mounted at an outlet end of the stack 101 and may measure coolant exit temperature of the stack 101. In other words, the second temperature sensor 120 may measure the temperature of the coolant circulating through the stack 101.

Thermistors, resistance temperature detectors (RTDs), and/or thermocouples may be used as the first temperature sensor 110 and the second temperature sensor 120.

The APS 130 may measure the position of an accelerator pedal depending on a user operation of the accelerator pedal. The APS 130 may output a voltage depending on the position of the accelerator pedal. The output voltage of the APS 130 may be used to calculate an accelerator pedal position.

The BMS 140 serves to optimally manage a high-voltage battery (hereinafter, referred to as the battery) (not illustrated) to improve energy efficiency of the battery and increase the lifetime of the battery. The BMS 140 may prevent overcharge or over discharge by monitoring the voltage, current, and temperature of the battery in real time. The BMS 140 may monitor the remaining amount of a charge of the battery, that is, a state of charge (SOC). Here, the battery may supply power required for driving the vehicle and may be charged by electrical energy produced by the stack 101.

The storage 150 may store measurement values measured by the sensors 110, 120, and 130. The storage 150 may store input data and/or output data depending on predetermined setting information and/or operation of the processor 180. The storage 150 may be a non-transitory storage medium that stores instructions executed by the processor 180. The storage 150 may be implemented with at least one storage medium (recording medium) among storage media (recording media) such a flash memory, a hard disk, a secure digital (SD) card, an random access memory (RAM), a static random access memory (SRAM), a read only memory (ROM), a programmable read only memory (PROM), an electrically erasable and programmable ROM (EEPROM), an erasable and programmable ROM (EPROM), and/or a register.

The drive motor 160 may receive power from the stack 101 and/or the battery (not illustrated), may generate power, and may transmit the power to driving wheels. The drive motor 160 may adjust output torque (motor torque) according to an instruction of the processor 180.

The air-conditioning controller 170 may adjust the temperature of the indoor space of the vehicle depending on a preset temperature. The air-conditioning controller 170 may set a set temperature in response to a user input. The air-conditioning controller 170 may compare the set temperature and the indoor temperature, and when the indoor temperature is higher than the set temperature, the air-conditioning controller 170 may operate an air-conditioning system in a cooling mode to lower the indoor temperature. When the indoor temperature is lower than the set temperature, the air-conditioning controller 170 may operate the air-conditioning system in a heating mode to raise the indoor temperature.

The processor 180 may control an overall operation of the fuel cell control apparatus 100. The processor 180 may be implemented with at least one of an application specific integrated circuit (ASIC), a digital signal processor (DSP), programmable logic devices (PLDs), field programmable gate arrays (FPGAs), a central processing unit (CPU), microcontrollers, or microprocessors.

The processor 180 may control an operation of the cooling fan 1051, based on the coolant exit temperature of the stack 101 measured by the second temperature sensor 120. The processor 180 may adjust the RPM of the cooling fan 1051 depending on the coolant exit temperature.

The processor 180 may detect (determine) whether the cooling fan 1051 is defective, based on a response signal received from the cooling module 105. In other words, the processor 180 may determine whether the cooling fan 1051 is defective, based on a response signal transmitted from a motor (not illustrated) of the cooling fan 1051 for a command. The processor 180 may identify a defective fan in the cooling fan 1051.

When the cooling fan 1051 is detected to be defective, the processor 180 may analyze a defect situation of the cooling fan 1051 and may determine a fail-safe control method depending on the defect situation. The fail-safe control method may be classified into a first control method and a second control method. The first control method may limit the output of the stack 101 depending on the coolant exit temperature of the stack 101 and may increase the revolutions per minute (RPM) of a normally-operating fan F1 or F2. The second control method may decrease the output of the stack 101 in consideration of the coolant exit temperature of the stack 101, may limit the maximum torque of the drive motor 160, and may stop indoor air-conditioner operation (cooling).

When either of the fans F1 and F2 in the cooling fan 1051 is defective, the processor 180 may control the output of the stack 101 according to the first control method. The processor 180 may identify the coolant exit temperature by using the second temperature sensor 120 and may limit the output (e.g., current) of the stack 101, based on the identified coolant exit temperature. In other words, in the situation in which one fan is defective, the processor 180 may control the output of the stack 101 such that the output of the stack 101 does not exceed a maximum output limit value of the stack 101 depending on the coolant exit temperature. Furthermore, the processor 180 may increase the RPM of the normally-operating fan F 1 or F2, thereby improving cooling performance of the stack 101.

When both the fans F1 and F2 are defective, the processor 180 may control the output of the stack 101 according to the second control method. The processor 180 may decrease the output of the stack 101, based on the coolant exit temperature measured by the second temperature sensor 120. In the situation in which the two fans are defective, the processor 180 may control the output of the stack 101 such that output of the stack 101 does not exceed the maximum output limit value of the stack 101 depending on the coolant exit temperature. Furthermore, the processor 180 may limit the maximum torque of the drive motor 160 and may instruct the air-conditioning controller 170 to stop air-conditioner operation (cooling).

The processor 180 may determine an output limit level (a first limit level) of the stack 101, based on the ambient air temperature measured by the first temperature sensor 110. The first limit level may be divided into three step levels depending on the ambient air temperature. A temperature range in which limitation of the output of the stack 101 is unnecessary may be classified as Level 1 LV.1, a temperature range in which micro output limitation of the stack 101 is necessary may be classified as Level 2 LV.2, and a temperature range in which strong output limitation of the stack 101 is necessary may be classified as Level 3 LV.3. Limiting factors may be set for the respective levels. For example, the limiting factors of Level 1, Level 2, and Level 3 may be set to 1, 0.7, and 0.5, respectively. Although it has been exemplified that the first limit level is divided into the three levels, the first limit level, without being limited thereto, may be divided into two, four, or more levels.

The processor 180 may set an output limit level (a second limit level) of the stack 101 depending on an SOC of the battery and an output requirement (kW) (or, accelerator pedal position (%)). The processor 180 may identify the SOC through the BMS 140 and may identify the output requirement by using the APS 130. The second limit level may be divided into six step levels, based on the SOC and the output requirement. For example, an SOC range may be divided into three sections, an output requirement range may be divided into two section, and Level 1 LV.1, Level 2 LV.2, and Level 3 LV.3 may be sequentially set from a section having a high SOC to a section having a low SOC in a section in which the output requirement is low. Level 4 LV.4, Level 5 LV.5, and Level 6 LV.6 may be sequentially set from a section having a high SOC to a section having a low SOC in a section in which the output requirement is high. As the SOC decreases and the output requirement increases, usage of the output of the stack 101 may increase, and accordingly a stack overheating situation may occur. Therefore, output limitation may be strongly set as the level increases. Limiting factors for the respective levels (that is, factors depending on the SOC and the output requirement) may be set based on target output lowered depending on a fan defect situation. Here, the limiting factors may be between 0 and 1 and may be set to a small value as the level increases. For example, the limiting factors matching Level 1, Level 2, Level 3, Level 4, Level 5, and Level 6 may be set to 0.9, 0.8, 0.7, 0.6, 0.5, and 0.4, respectively. That is, as the level increases, an output limit of the stack 101 may be increased.

Figure 2:
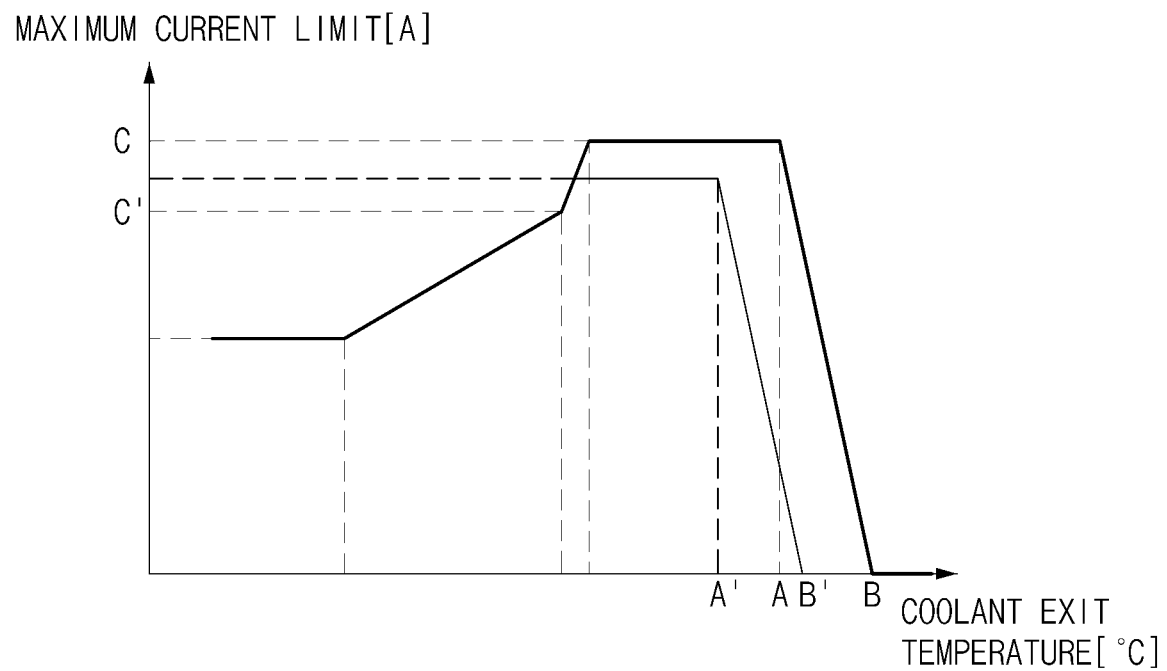
FIGS. 2 and 3 are views illustrating a fail-safe control method according to embodiments of the present disclosure.
Figure 3:
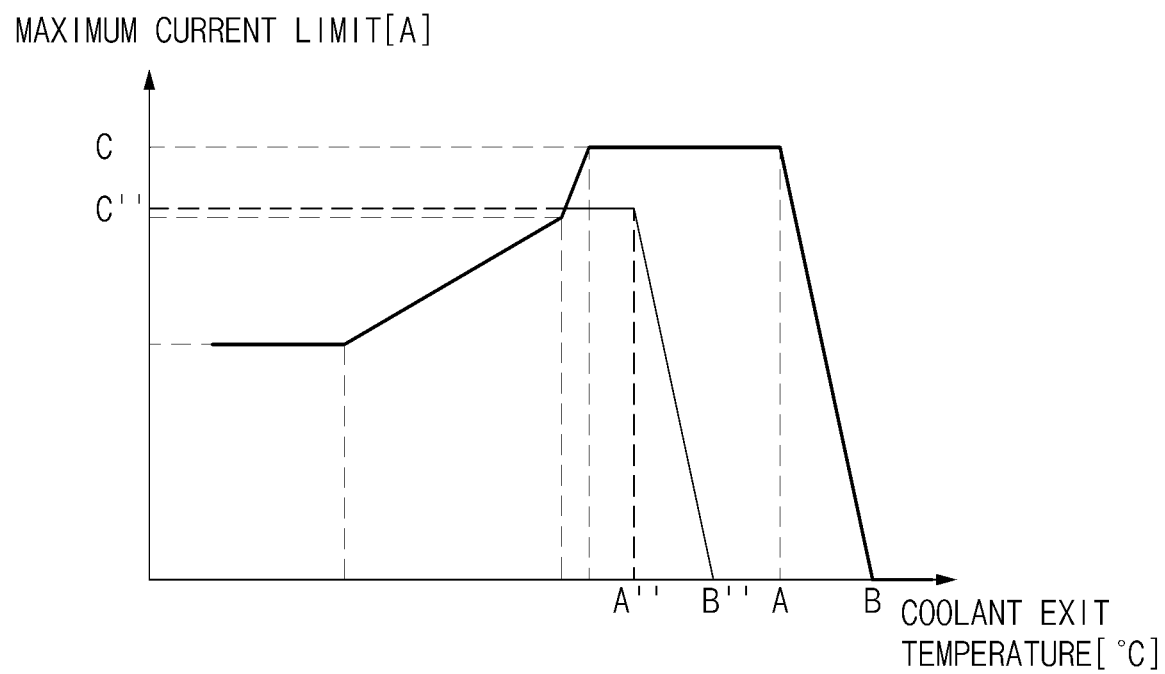

FIGS. 2 and 3 are views illustrating a fail-safe control method according to embodiments of the present disclosure.

Referring to FIGS. 2 and 3, in a situation in which the cooling fan 1051 normally operates, coolant exit temperature at which current limitation starts is A, coolant exit temperature at which the maximum current limit value is equal to "0" is B, and the maximum current limit value, that is, the maximum available stack current value is C. In other words, the processor 180 may limit the maximum output of the stack 101 to C until the coolant exit temperature of the stack 101 reaches A and may decrease the output of the stack 101 when the coolant exit temperature exceeds A. The processor 180 may stop the output of the stack 101 when the coolant exit temperature reaches B.

For output control of the stack 101 when the cooling fan 1051 is defective, a current limit value of the stack 101 depending on the coolant exit temperature may be set in a harsh environment. First, the harsh environment may be selected to set the current limit value.

For example, a possibility of deterioration in durability of the stack 101 (cooling efficiency) may be evaluated in the following three driving conditions.

Driving Conditions
(1) Stop during travel at the highest speed (the maximum available speed of the vehicle) in a high-temperature state of the stack
(2) Stop during travel on an uphill road at low speed in a high-temperature state of the stack
(3) Acceleration or deceleration during travel on a long uphill road and a downhill road in a high-temperature state of the stack In the condition (1), the stack 101 is overheated with the maximum output of the stack 101, and ram air is removed after the stop. In the condition (2), cooling efficiency by ram air is deteriorated due to the low speed, and the ram air is removed after the stop. In the condition (3), stack overheating and deterioration in cooling efficiency by ram air appear in combination, and the output of the stack 101 may be rapidly changed due to repetition of acceleration and deceleration.

Among the driving conditions that deteriorate cooling efficiency of the stack 101, the condition (1) in which cooling efficiency is most seriously deteriorated may be selected as the harsh environment in which there is a possibility of deterioration in durability.

When the harsh environment is selected, the current limit value of the stack 101 depending on the coolant exit temperature may be calibrated according to a defect situation of the cooling fan in the corresponding harsh environment.

First, when either of the fans F1 and F2 in the cooling fan 1051 is defective, the current limit value depending on the coolant exit temperature may be calibrated according to the following setting criteria.

Setting Criteria
(1) Lower 10% with respect to a stack exit coolant maximum value (prevent excess of stack limit operation temperature)
(2) Lower 10% with respect to maximum vehicle speed (set maximum vehicle speed at which there is no possibility of deterioration in durability)
(3) Set stack temperature to a temperature equal to or lower than temperatures of the electric radiator, the condenser, and the indoor space of the vehicle Based on the setting criteria, when either of the fans F1 and F2 in the cooling fan 1051 is defective, coolant exit temperature at which current limitation starts and coolant exit temperature at which the maximum current limit value is equal to "0" are set to A' and B', respectively, and the maximum current limit value is set to C'. The calibrated A', B', and C' may be selected in the range of 80% to 95% with regard to A, B, and C in the normal situation of the cooling fan.

When either of the fans F1 and F2 in the cooling fan 1051 is defective, the processor 180 may limit the maximum output of the stack 101 to C' until the coolant exit temperature of the stack 101 reaches A', may linearly decrease the output of the stack 101 depending on the coolant exit temperature from when the coolant exit temperature exceeds A', and may stop the output of the stack 101 when the coolant exit temperature reaches B'.

In the selected harsh environment, when either of the fans F1 and F2 in the cooling fan 1051 is defective, the current limit value depending on the coolant exit temperature may be calibrated according to the following setting criteria.

Setting Criteria
(1) Lower 15% with respect to the stack exit coolant maximum value (prevent excess of the stack limit operation temperature)
(2) Lower 20% with respect to the maximum vehicle speed (select maximum vehicle speed at which durability is ensured)
(3) Set stack temperature to a temperature equal to or lower than temperatures of the electric radiator and the condenser
(4) Set a motor maximum torque limit in consideration of stop of cooling due to inability to cool by fan operation
(5) At the beginning of maximum speed driving, motor torque and cooling water-temperature excess is within 80% of a hardware limit Based on the setting criteria, when either of the fans F1 and F2 in the cooling fan 1051 is defective, coolant exit temperature at which current limitation starts and coolant exit temperature at which the maximum current limit value is equal to "0" are set to A" and B", respectively, and the maximum current limit value is set to C". The calibrated A", B", and C" may be selected in the range of 70% to 95% with regard to A, B, and C in the normal situation of the cooling fan.

When either of the fans F1 and F2 in the cooling fan 1051 is defective, the processor 180 may limit the maximum output of the stack 101 to C" until the coolant exit temperature of the stack 101 reaches A" and may linearly decrease the output of the stack 101 from when the coolant exit temperature exceeds A". The processor 180 may stop the output of the stack 101 when the coolant exit temperature reaches B".

Figure 4:
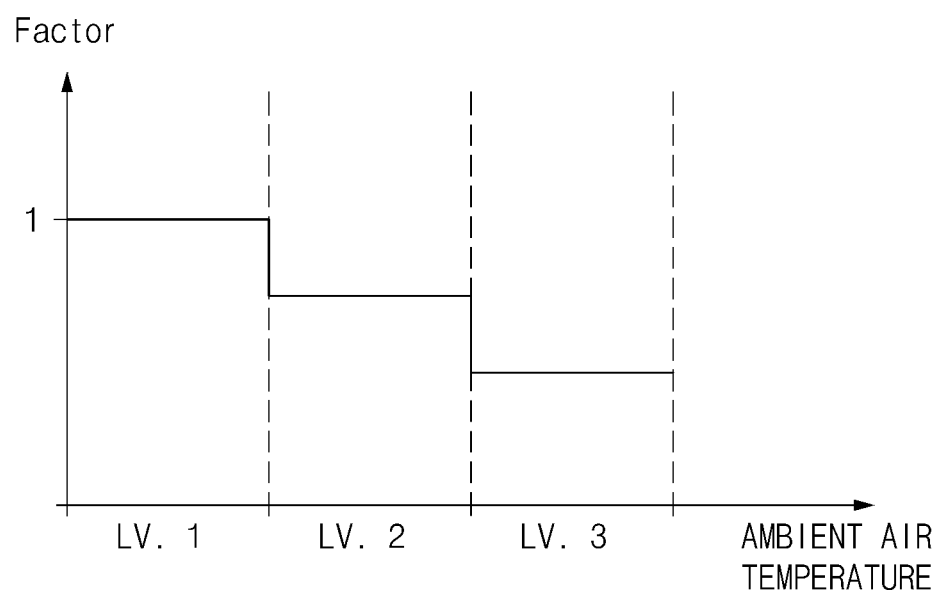
FIGS. 4 and 5 are views illustrating output limit level settings according to embodiments of the present disclosure.
Figure 5:
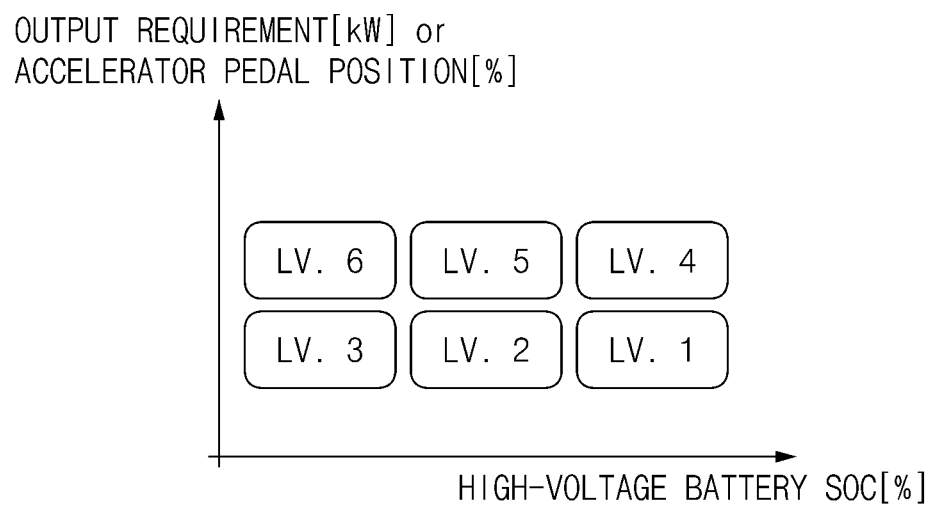

FIGS. 4 and 5 are views illustrating output limit level settings according to embodiments of the present disclosure.

Referring to FIG. 4, the output limit level (the first limit level) depending on ambient air temperature may be divided into three step levels. That is, an ambient air temperature range may be divided into three sections, and Level 1 LV.1, Level 2 LV.2, and Level 3 LV.3 may be set from a range in which the ambient air temperature is low. Here, Level 1 is a step that does not correspond to ambient air over-temperature and does not require output limitation setting, Level 2 is a step that requires micro output limitation setting due to ambient air over-temperature, and Level 3 is a step that requires strong output limitation setting due to ambient air over-temperature.

In Level 1 that does not require output limitation of the stack 101 due to low ambient air temperature, output limitation of the stack 101 may be prevented. In other words, when Level 1 is determined as the first limit level, output of the stack 101 is not limited.

In Level 2 and Level 3 that require output limitation due to ambient air over-temperature, an output limitation quantity of the stack 101 may be adjusted by applying limiting factors matching the levels.

Referring to FIG. 5, the output limit level (the second limit level) may be divided into six step levels depending on an available stack output level based on an SOC of the battery and an output requirement. As the SOC decreases and the output requirement (or, the accelerator pedal position) increases, usage of the output of the stack 101 may increase, and accordingly a stack overheating situation may occur. Therefore, output limitation may be strongly set as the level increases. In other words, the higher the available stack output level, the higher the level.

The second limit level may be divided into six sections, based on an SOC of the battery and an output requirement (a torque requirement) of a driver. Level 1 LV.1 to Level 6 LV.6 may be sequentially set from a section in which the output requirement is low and the SOC is high to a section in which the output requirement is high and the SOC is low. Limiting factors for the respective levels may be set based on a target output value lowered depending on a fan defect situation.

Figure 6:
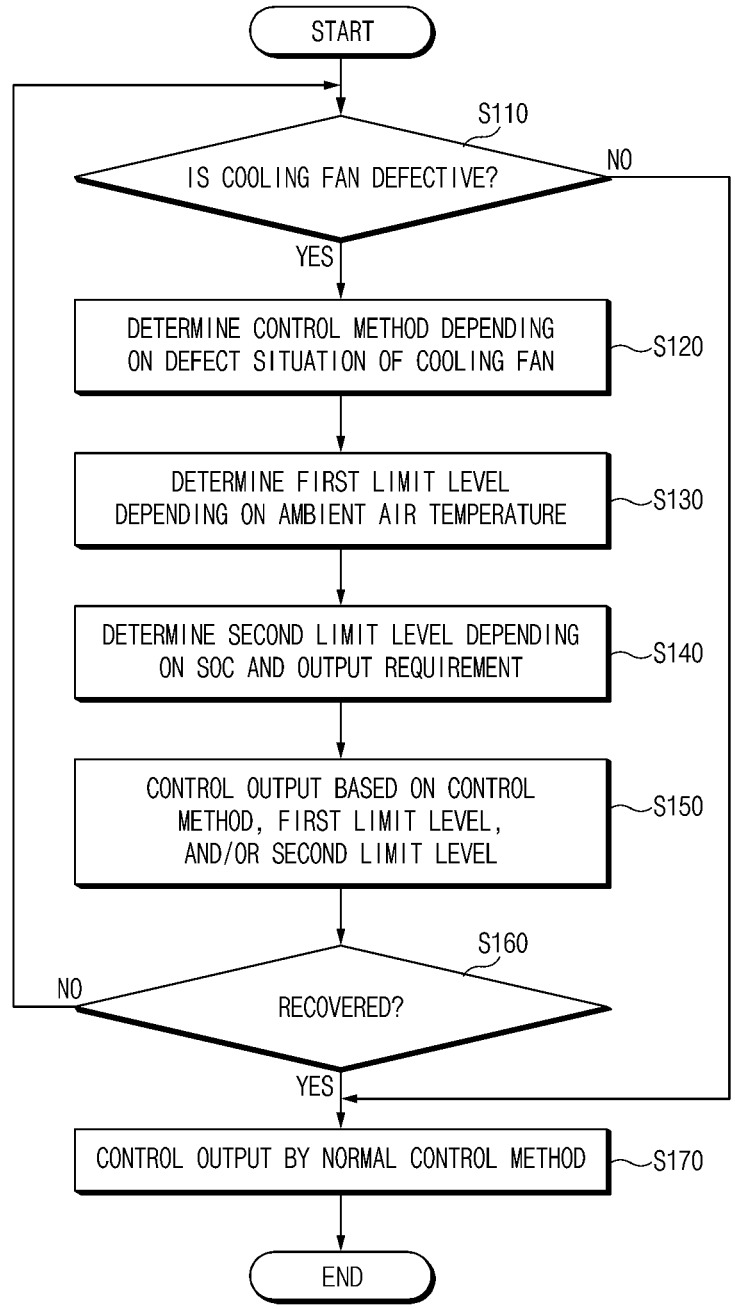
FIG. 6 is a flowchart illustrating a fuel cell control method according to embodiments of the present disclosure.

FIG. 6 is a flowchart illustrating a fuel cell control method according to embodiments of the present disclosure.

Referring to FIG. 6, the processor 180 may detect whether the cooling fan 1051 is defective at S110. The processor 180 may detect whether the cooling fan 1051 is defective, through communication with the cooling module 105. The processor 180 may identify a defective one of the fans F1 and F2 in the cooling fan 1051.

When the cooling fan 1051 is detected to be defective, the processor 180 may determine a fail-safe control method (a control method) depending on a defect situation of the cooling fan 1051 at S120. When either of the fans F1 and F2 in the cooling fan 1051 is defective, the processor 180 may select the first control method as the fail-safe control method. When both the fans F1 and F2 in the cooling fan 1051 are defective, the processor 180 may select the second control method as the fail-safe control method.

The processor 180 may set the first limit level depending on ambient air temperature at S130. The processor 180 may detect the ambient air temperature by using the first temperature sensor 110. The processor 180 may determine the first limit level, based on the detected ambient air temperature.

The processor 180 may set the second limit level depending on a state of charge (SOC) and an output requirement at S140. The processor 180 may identify the output requirement of the user by using the APS 130 and may identify the SOC of the battery through communication with the BMS 140. The processor 180 may determine the second limit level, based on the SOC and the output requirement identified.

The processor 180 may control output of the stack 101, based on at least one of the determined control method, the set first limit level, or the set second limit level at S150. When the first control method is determined, the processor 180 may identify coolant exit temperature of the stack 101 by using the second temperature sensor 120 and may limit the output of the stack 101, based on an output limit value matching the identified coolant exit temperature. Furthermore, the processor 180 may increase the RPM of a normally-operating fan F1 or F2. When the second control method is determined, the processor 180 may limit the output of the stack 101 such that the output of the stack 101 does not exceed the maximum output limit value depending on coolant exit temperature measured by the second temperature sensor 120. Furthermore, the processor 180 may limit the maximum torque of the drive motor 160 and may stop cooling. The processor 180 may correct the predetermined maximum output limit value by applying a limiting factor matching the set first limit level and/or a limiting factor matching the set second limit level and may limit the output of the stack 101, based on the corrected maximum output limit value.

The processor 180 may determine whether the defect in the cooling fan 1051 is recovered at S160. The processor 180, while limiting the output of the stack 101, may periodically determine whether the defect in the cooling fan 1051 is recovered. The processor 180 may return to S110 when the defect in the cooling fan 1051 is not recovered.

When the defect in the cooling fan 1051 is recovered, the processor 180 may control the output of the stack 101 by a normal control method at S170. The normal control method refers to a default control method that controls the output of the stack 101 in a situation in which the cooling fan 1051 normally operates.

According to the present disclosure, the fuel cell control apparatus and method may optimally control the output of the fuel cell stack in terms of performance and durability of the fuel cell stack in consideration of an environmental condition and a vehicle state in a situation in which the cooling fan is defective.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. An apparatus for controlling a fuel cell, the apparatus comprising:
 a cooling module configured to cool a fuel cell stack, wherein the cooling module includes a first cooling fan and a second cooling fan;
 a first temperature sensor configured to measure an ambient air temperature of a vehicle; and
 a processor configured to, when a defect of the first cooling fan or the second cooling fan is detected, determine a fail-safe control method depending on a defect situation of the first cooling fan or the second cooling fan, set a first limit level depending on the ambient air temperature, set a second limit level depending on a state of charge (SOC) of a battery and an output requirement, and control limitation of output of the fuel cell stack, based on at least one of the fail-safe control method, the first limit level, or the second limit level;
 wherein when determining the fail-safe control method, the processor differentiates the control method depending on whether one or both cooling fans of the first cooling fan and the second cooling fan have failed, and differently executes the control of output of the fuel cell stack, a normally-operating fan, a torque of a drive motor, and operation of an indoor air conditioner.

2. The apparatus of claim 1, wherein the cooling module includes:
 the first cooling fan and the second cooling fan disposed on one side of the fuel cell stack and configured to introduce ambient air into the fuel cell stack;
 a stack radiator disposed on one side of the first cooling fan and the second cooling fan and configured to cool coolant circulating through the fuel cell stack;
 an electric radiator disposed on one side of the stack radiator and configured to cool a power electronic part of the vehicle; and
 a condenser disposed on one side of the stack radiator side by side with the electric radiator.

3. The apparatus of claim 1, wherein the processor determines a first control method when either of the first cooling fan or the second cooling fan is defective, and determines a second control method when both the first cooling fan and the second cooling fan are defective.

4. The apparatus of claim 3, wherein when the first control method is determined, the processor limits the output of the fuel cell stack depending on coolant exit temperature of the fuel cell stack, based on a maximum output limit value depending on the coolant exit temperature and increases revolutions per minute (RPM) of the normally-operating fan.

5. The apparatus of claim 3, wherein when the second control method is determined, the processor decreases the output of the fuel cell stack in consideration of coolant exit temperature of the fuel cell stack, based on a maximum output limit value depending on the coolant exit temperature, limits maximum torque of the drive motor, and stops operation of the indoor air-conditioner.

6. The apparatus of claim 1, wherein the first limit level is divided into three sections depending on ambient air temperature, and the higher the ambient air temperature, the higher the level.

7. The apparatus of claim 1, wherein the second limit level is divided into six sections depending on an available stack output level based on the SOC and the output requirement, and the higher the available stack output level, the higher the level.

8. The apparatus of claim 1, wherein the processor corrects a maximum output limit value of the fuel cell stack by applying at least one of a limiting factor matching the first limit level or a limiting factor matching the second limit level.

9. The apparatus of claim 1, wherein the processor determines whether the defect in the first cooling fan or the second cooling fan is recovered, while limiting the output of the fuel cell stack, and controls the output of the fuel cell stack by a normal control method when the defect in the first cooling fan or the second cooling fan is recovered.

* * * * *